(12) United States Patent
Li et al.

(10) Patent No.: US 8,846,782 B2
(45) Date of Patent: Sep. 30, 2014

(54) INK FOR INKJET COMPUTER-TO-PLATE AND PREPARATION METHOD OF THE SAME

(75) Inventors: Huiling Li, Beijing (CN); Gang Li, Beijing (CN); Yanlin Song, Beijing (CN)

(73) Assignee: Institute of Chemistry, Chinese Academy of Sciences, Beijing (CN)

( * ) Notice: Subject to any disclaimer, the term of this patent is extended or adjusted under 35 U.S.C. 154(b) by 18 days.

(21) Appl. No.: 13/635,325

(22) PCT Filed: Sep. 15, 2010

(86) PCT No.: PCT/CN2010/076794
§ 371 (c)(1),
(2), (4) Date: Sep. 14, 2012

(87) PCT Pub. No.: WO2011/116590
PCT Pub. Date: Sep. 29, 2011

(65) Prior Publication Data
US 2013/0012622 A1   Jan. 10, 2013

(30) Foreign Application Priority Data
Mar. 22, 2010   (CN) .......................... 2010 1 0130875

(51) Int. Cl.
*C09D 11/00* (2014.01)
*C09D 11/10* (2014.01)
*C09D 11/36* (2014.01)

(52) U.S. Cl.
CPC ............... *C09D 11/36* (2013.01); *C09D 11/10* (2013.01)
USPC .......................... 523/160; 427/384; 106/31.13

(58) Field of Classification Search
None
See application file for complete search history.

(56) References Cited

U.S. PATENT DOCUMENTS 7,148,268 B2   12/2006   Zhu
2008/0081117 A1*   4/2008   Sakasai .................. 427/384

FOREIGN PATENT DOCUMENTS

| CN | 100577754 | * | 1/2006 |
|---|---|---|---|
| CN | 1789347 | | 6/2006 |
| CN | 1800982 | | 7/2006 |
| CN | 100562804 | | 7/2006 |
| CN | 101007645 | | 8/2007 |
| CN | 101020796 | | 8/2007 |
| CN | 101063014 | | 10/2007 |
| CN | 101240129 | | 8/2008 |
| CN | 101275043 | | 10/2008 |
| CN | 101418157 | | 4/2009 |
| EP | 1903079 | | 3/2008 |
| JP | 2008081651 | | 4/2008 |
| JP | 2009249578 | | 10/2009 |
| WO | 04000956 | | 12/2003 |
| WO | 2010021186 | | 2/2010 |

OTHER PUBLICATIONS

Huiling Li et al., Full tranlsation of CN 100577754, Wear-Resistant Ink Used in Inkjet CTP Technology and Preparation Method Thereof, Jan. 2006, p. 1-14.*

* cited by examiner

*Primary Examiner* — Susannah Chung
*Assistant Examiner* — Robert T Butcher
(74) *Attorney, Agent, or Firm* — Volpe and Koenig, P.C.

(57) ABSTRACT

An ink for inkjet computer-to-plate and a preparation method of the same are provided. Calculated in mass percentage based on the total mass of the ink, the ink comprises 10%~30% of cross-linkable resin, 10%~35% of solvent with a low boiling point, 5%~30% of poor solvent with a high boiling point and 5%~75% of bulk solvent. The preparation method comprises the following steps: mixing the above components and agitating at room temperature; after the cross-linkable resin is dissolved, ball milling and filtrating to remove insoluble substance and/or impurities in the liquid obtained by the ball milling. The ink can be formed into an image by printing on the treated surface of aluminum plate using ink-jet printer, and after heat cured, it can form an image with a high resolution and be used to print directly on machine, thus reducing post treatment process and obtaining the plate of ink-jetting direct plate-making.

7 Claims, 1 Drawing Sheet

INK FOR INKJET COMPUTER-TO-PLATE AND PREPARATION METHOD OF THE SAME

This application is a 35 U.S.C. §371 national phase application of PCT/CN2010/076794, which was filed Sep. 15, 2010 and is incorporated herein by reference as if fully set forth.

FIELD OF THE INVENTION

The present invention pertains to the ink field, and relates to an ink that is helpful for improving image resolution, in particular relates to an ink and a preparation method of the same, which is used for making plates by direct printing in inkjet computer-to-plate (CTP) technique and is helpful for improving image resolution.

BACKGROUND OF THE INVENTION

Inkjet CTP technique is a technique that is used to directly print images on a substrate with an inkjet printing device. Compared with the laser imaging and thermo-sensitive imaging techniques, the inkjet CTP technique has the major drawbacks of limited resolution and inferior imaging quality, resulting from the pore size of spray nozzles of inkjet printer. At present, there are two inkjet CTP approaches. One of the approaches is to directly spray ink on a blank substrate to form images, which is cheap and simply; the ink used in this approach can be a water-soluble ink solution, a thermosetting ink, or an ultraviolet (UV)-curing ink, but the produced plate has a printing durability of 10,000 or 20,000 copies, and the imaging quality and resolution are lower (lower than 133 lpi, and therefore is only applicable to the fields those do not have high requirements for the imaging resolution and quality, such as newspaper printing industry). The other approach is to spray ink on a positive PS substrate in a masking manner, and the photo-sensitive coating can be photolytic or photopolymeric, and the negative substrate can be omitted; however, the exposure and development are still required, and all printing conditions are similar to those of conventional PS printing; therefore, the process is complex and the cost of consumptive material is high.

SUMMARY OF THE INVENTION

An object of the present invention is to provide an ink that is used for inkjet computer-to-plate and is helpful for improving the image resolution of the plate; the ink can be used to print on the pre-treated aluminum substrates (e.g., the aluminum substrate described in Chinese Patent Application No. 200610011259.1 (CN100460327C)) or the commercial anodized aluminum substrate to make plates, and the produced plates have a high printing durability and a high resolution. Thus, the present invention overcomes the drawbacks in the existing inkjet CTP process and solves the problems limiting the development and application of the inkjet CTP process.

Another object of the present invention is to provide a preparation method of an ink that is used for the inkjet computer-to-plate and is helpful for improving the image resolution of the plate.

The inventor of the present invention has found that a major cause for poor image quality in the existing inkjet CTP process lies in that both the pre-treated aluminum substrate (see Chinese Patent Application No. 200610011259.1) and the commercial anodized aluminum substrate have high specific surface energy; as a result, both inorganic solution and organic solution can spread and infiltrate easily on the surface of the above two substrates; therefore, the ordinary ink diffuses severely on the surface of the above two substrates and thereby results in lower image resolution when the ink is sprayed on the surface. Deinfiltration phenomenon is a non-infiltration phenomenon resulting from the existence of difference in surface tension between solid and liquid or between liquid and liquid at a liquid-solid or liquid-liquid interface; specifically, it means that a liquid on a solid surface shrinks into liquid droplets, or a liquid can not spread effectively on the surface of a different liquid and thereby exists in a form of liquid droplets on the surface of the latter. The present invention utilizes the deinfiltration phenomenon to produce high-resolution images on the surface of the aluminum substrate described above. Specifically, after the ink of the present invention is printed through the spray nozzles of an inkjet printer to the surface of aluminum substrate, the interfacial tension on the liquid-liquid interface between the poor solvent with a high boiling point and the solvent with a low boiling point and/or the bulk solvent in the ink changes as the solvent with a low boiling point volatilizes, thereby the deinfiltration happens on the interface between the system of the solvent with a low boiling point and/or the bulk solvent and the poor solvent with a high boiling point, and the system of the solvents with a low boiling point and/or the bulk solvent that contains dissolved cross-linkable resin shrinks to form smaller ink dots on the surface of the aluminum substrate, thereby forms high-resolution images. The poor solvent with a high boiling point will volatilize completely in the process of heat curing, therefore will not have impact on the subsequent printing process. The blank part without printed image will be directly damped by water that serves as the dampening solution, so as to effectively prevent the substrate from being polluted and to meet the requirements for material saving and environmental protection. The deinfiltration process of the ink of the present application on the surface of aluminum substrate is shown in FIG. 1.

The ink of the present application, which is used for the inkjet computer-to-plate process and is helpful for improving the image resolution, is made by at least one cross-linkable resin and mixed solvent; it can be printed by means of an inkjet printer on the surface of a specially treated aluminum substrate (see Chinese Patent Application No. 200610011259.1) or a commercial anodized aluminum substrate to form printed images, which forms high-resolution images after curing; the obtained plate can be directly used for printing, so as to obtain high-quality inkjet CTP plates without any post-treatment.

The first object of the present invention is to provide an ink that is used for inkjet computer-to-plate process and is helpful for improving image resolution; calculated in mass percent and based on the total mass of the ink, the ink comprises:

cross-linkable resin: 10%~30%
solvent with a low boiling point: 10%~35%
poor solvent with a high boiling point: 5%~30%
bulk solvent: 5%~75%

The cross-linkable resin is at least one selected from the group consisting of epoxy resin, phenolic resin, and silicone resin, etc. These types of resin are common constituents in the ink, and are commercially available. These types of resins are thermosetting ones, which is to say, they will be cured only at a temperature equal to or higher than a specific value, and the ink will not cured during the inkjet process, therefore, print nozzles of the inkjet printer will not be jammed.

The solvent with a low boiling point is a solvent with a boiling point lower than 100° C., therefore is highly volatile;

for example, the solvent with a low boiling point can be at least one selected from the group consisting of ethanol, diethyl ether, and ethyl acetate, etc.

The poor solvent with a high boiling point is at least one selected from the group consisting of ethylene glycol, propylene glycol, and dipropylene glycol monomethyl ether acetate, etc. The poor solvent with a high boiling point can be mixed with the solvent with a low boiling point and/or bulk solvent to form a stable dispersed system, and is used as a diluent for the ink system.

The bulk solvent is at least one selected from the group consisting of ethylene glycol monomethyl ether, ethylene glycol monoethyl ether, cyclohexanone, diethylene glycol monoethyl ether, and propylene glycol monomethyl ether propionate, etc.

Preferably, the ink provided by the present invention is a filtrate obtained by removing insoluble substances and/or impurities in the mixed liquid for preparing the ink by means of multistage filtration.

The second object of the present invention is to provide a preparation method of an ink for inkjet computer-to-plate, which is helpful for improving image resolution, the method comprises the following steps: calculated in mass percentage and based on the total mass of the ink, mixing cross-linkable resin in an amount of 10%~30%, solvent with a low boiling point in an amount of 10%~35%, poor solvent with a high boiling point in an amount of 5%~30%, and bulk solvent in an amount of 5%~75% and agitating at room temperature (preferably for 8~12 h) to form a mixture; after the cross-linkable resin is dissolved completely, adding zirconium balls into the mixture to carry out ball milling (usually for 20~30 h); carrying out multistage filtration with sand core funnels to remove insoluble substances and/or impurities in a liquid obtained by the ball milling to obtain a first filtrate, and then filtering the first filtrate with a filter membrane having a pore size of 0.22 μm to further remove tiny insoluble substances and/or impurities in the liquid obtained by the ball milling, so as to obtain a second filtrate, which is the ink described in the present invention.

Since the cross-linkable resin in the ink of the present invention has a good oleophilicity and heat-curing performance; and the poor solvent with a high boiling point has a feature of volatilizing very slowly, which ensures that the ink will not dry up quickly due to volatilization; since the bulk solvent has basic physical characteristics meeting with the inkjet printer and essentially meeting with the industry standard of ink for inkjet printing (QB/T2730.1-2005), the prepared ink has features such as moderate diffusibility, high resolution of plate, high oleophilicity of ink marks, high inking speed, and high durability, etc.

After the above-mentioned ink is printed on an aluminum substrate and is cured for 20 min at 130° C., a plate with high resolution, which can be directly used for printing, is obtained. No other chemical treatment is required.

When the ink is used in an inkjet CTP7600 system (see Chinese Patent Application No. 200510132248.4 (CN1800982A), titled as "Inkjet Imaging Based Computer-to-Plate Method and Apparatus"), the produced plate can achieve a screen dot reproducibility of 98% or higher and a resolution up to 175 LPI; the result of printing shows that the inking speed is high, the information of screen dot is complete, and the durability is up to 50,000 copies or higher.

The ink of the present invention that is used for inkjet computer-to-plate process and is helpful for improving image resolution can form printed images with high-resolution when it is printed by means of an inkjet printer on the surface of a treated aluminum substrate or a commercial anodized aluminum substrate; then the produced plate can be directly used for printing after cured, without any post-treatment; therefore, the ink can be used to obtain high-quality inkjet CTP plates and can achieve high image resolution.

DETAILED DESCRIPTION OF THE EMBODIMENTS

The CCD images of the deinfiltration process of ink on the surface of an aluminum substrate in the following examples are observed and recorded with a contact angle meter (OCA 20, Beijing Eastern Data Physics Instrument Co., Ltd., Germany). The top views of the deinfiltration process of the ink on the surface of an aluminum substrate are photographed with a camera (Canon S450, Cannon Co., Japan), at a fixed distance between the camera and the aluminum substrate.

EXAMPLE 1

Measured in mass percentage on the basis of the total mass of ink, 10% of phenolic resin (a product from Liaoning Ruishida Co., Ltd.), 10% of ethanol, 5% of ethylene glycol, and 75% of ethylene glycol monomethyl ether are mixed and the mixture is agitated for 8 h at room temperature. After the resin is dissolved completely, zirconium balls are added to carry out ball milling for 24 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, so as to obtain a filtrate, which is the ink that is used for inkjet computer-to-printing and is helpful for improving image resolution.

Figure 1:
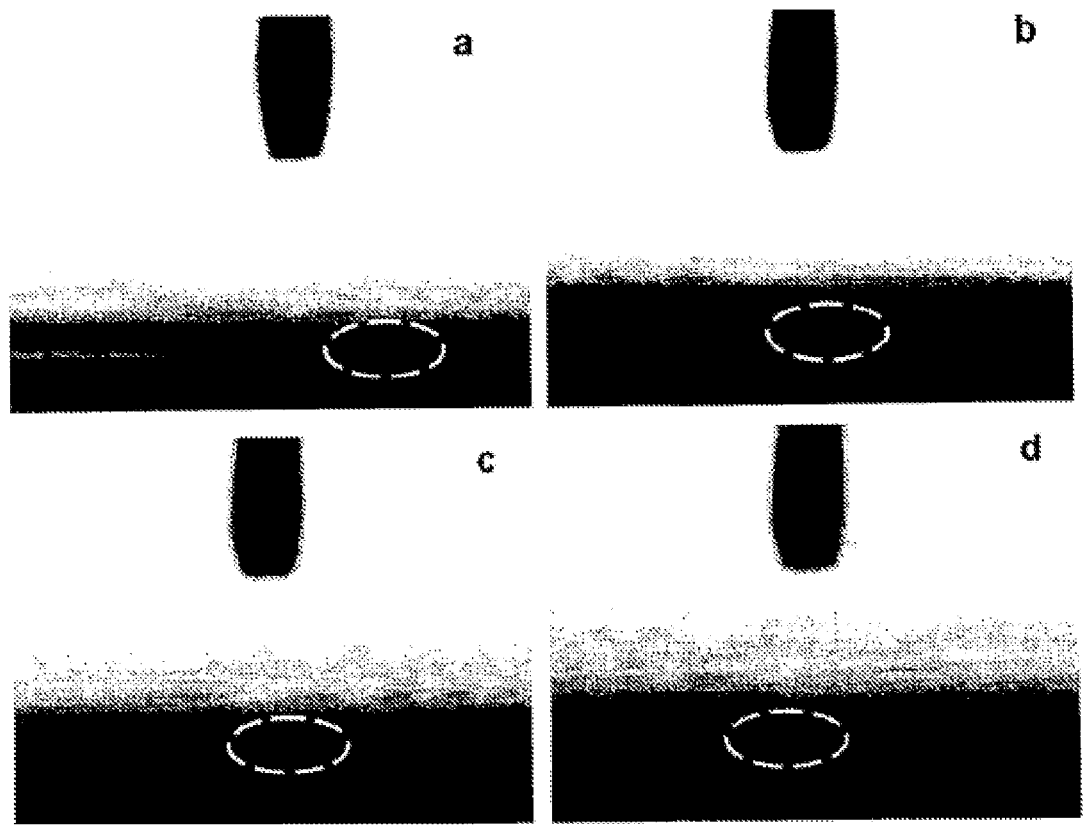
FIG. 1 shows CCD images of deinfiltration process of the ink in example 1 of the present invention on the surface of an aluminum substrate, the area enclosed by dotted lines on the image indicates the shrinkage boundary of the ink on the surface of the aluminum substrate, wherein, a: the boundary of ink at 5 s after the ink is dropped onto the surface of the aluminum substrate; b: the boundary of ink at 10 s after the ink is dropped onto the surface of the aluminum substrate; c: the boundary of ink at 20 s after the ink is dropped onto the surface of the aluminum substrate; d: the boundary of ink at 30 s after the ink is dropped onto the surface of the aluminum substrate.

3 μl ink prepared in example 1 is taken and dropped onto a surface of a commercial anodized aluminum substrate, to observe the shrinkage of the three phase contact line between the ink and the aluminum substrate depending on time with a contact angle meter, as shown in FIG. 1.

When the above ink is used in an inkjet CTP7600 system, the produced plate can achieve a screen dot reproducibility of 98% or higher, a resolution up to 175 LPI, and a durability up to 50,000 or more copies.

EXAMPLE 2

Measured in mass percentage on the basis of the total mass of ink, 30% of silicone resin (a product from Xinchuan Chemical (Tianjin) Co., Ltd.), 30% of ethyl acetate, 10% of propylene glycol, and 30% of ethylene glycol monoethyl ether are mixed and the mixture is agitated for 12 h at room temperature. After the resin is dissolved completely, zirconium balls are added to carry out ball milling for 24 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, so as to obtain a filtrate, which is the ink that is used for inkjet computer-to-printing and is helpful for improving image resolution.

Figure 2:
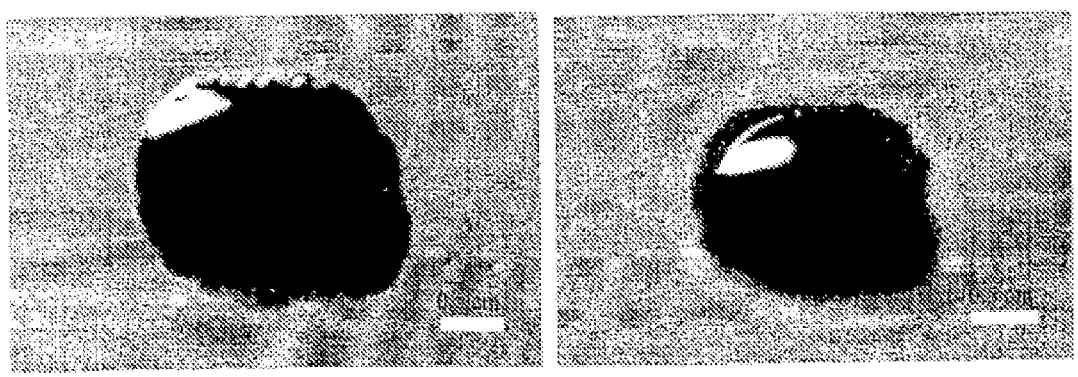
FIG. 2 shows top views of the deinfiltration process of the ink in example 2 of the present invention on the surface of an aluminum substrate; wherein, the left picture shows the appearance of an ink drop when the ink is dropped onto the surface of the aluminum substrate, and the right picture shows the appearance of the shape of the ink drop at 2 min after the ink is dropped onto the surface of the aluminum substrate; for the convenience of photographing and observation, a blue dye is added into the ink at an amount of 1% by mass based on the total amount of the ink solution; in actual application, no dye is added in the ink.

0.003 g blue dye is added into 3 g ink prepared in example 2, and the mixture is shaken to homogeneous. Then, 3 μl of the obtained ink mixture is dropped onto the surface of an aluminum substrate to observe the deinfiltration process and record the top views with a camera during the deinfiltration process, as shown in FIG. 2.

When the above ink is used in an inkjet CTP7600 system, the produced plate can achieve a screen dot reproducibility of 98% or higher, a resolution up to 175 LPI, and a durability up to 50,000 or more copies.

EXAMPLE 3

Measured in mass percentage on the basis of the total mass of ink, 20% of a mixture of phenolic resin and silicone resin (phenolic resin and silicone resin are mixed at a mass ratio of 1:1), 20% of diethyl ether, 30% of dipropylene glycol monomethyl ether acetate, and 25% of ethylene glycol monomethyl ether are mixed and the mixture is agitated for 10 h at room temperature. After the resins are dissolved completely, zirconium balls are added to carry out ball milling for 24 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, so as to obtain a filtrate, which is the ink that is used for inkjet computer-to-printing process and is helpful for improving image resolution.

When the above ink is used in an inkjet CTP7600 system, the produced plate can achieve a screen dot reproducibility of 98% or higher, a resolution up to 175 LPI, and a durability up to 50,000 or more copies.

EXAMPLE 4

Measured in mass percentage on the basis of the total mass of ink, 15% of epoxy resin (a product from South Asia Epoxy Resin (Kunshan) Co., Ltd.), 35% of a mixture of ethyl acetate and diethyl ether (ethyl acetate and diethyl ether are mixed at a mass ratio of 2:3), 5% of ethylene glycol, and 45% of cyclohexanone are mixed and the mixture is agitated for 8 h at room temperature. After the resin is dissolved completely, zirconium balls are added to carry out ball milling for 24 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, to obtain a filtrate, which is the ink that is used for inkjet computer-to-printing process and is helpful for improving image resolution.

When the above ink is used in an inkjet CTP7600 system, the produced plate can achieve a screen dot reproducibility of 98% or higher, a resolution up to 175 LPI, and a durability up to 50,000 or more copies.

EXAMPLE 5

Measured in mass percentage on the basis of the total mass of ink, 10% of a mixture of phenolic resin and epoxy resin (phenolic resin and epoxy resin are mixed at a mass ratio of 4:1), 10% of a mixture of ethanol, ethyl acetate, and diethyl ether (ethanol, ethyl acetate, and diethyl ether are mixed at a mass ratio of 5:2:3), 10% of ethylene glycol, and 70% of ethylene glycol monomethyl ether are mixed and the mixture is agitated for 12 h at room temperature. After the resins are dissolved completely, zirconium balls are added to carry out ball milling for 24 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, so as to obtain a filtrate, which is the ink that is used for inkjet computer-to-printing process and is helpful for improving image resolution.

When the above ink is used in an inkjet CTP7600 system, the produced plate can achieve a screen dot reproducibility of 98% or higher, a resolution up to 175 LPI, and a durability up to 50,000 or more copies.

EXAMPLE 6

Measured in mass percentage on the basis of the total mass of ink, 10% of a mixture of silicone resin and epoxy resin (silicone resin and epoxy resin are mixed at a mass ratio of 2:3), 10% of ethanol, 10% of propylene glycol, and 70% of ethylene glycol monomethyl ether are mixed and the mixture is agitated for 12 h at room temperature. After the resins are dissolved completely, zirconium balls are added to carry out ball milling for 24 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, so as to obtain a filtrate, which is the ink that is used for inkjet computer-to-printing process and is helpful for improving image resolution.

When the above ink is used in an inkjet CTP7600 system, the produced plate can achieve a screen dot reproducibility of 98% or higher, a resolution up to 175 LPI, and a durability up to 50,000 or more copies.

EXAMPLE 7

Measured in mass percentage on the basis of the total mass of ink, 10% of epoxy resin, 25% of diethyl ether, 30% of dipropylene glycol monomethyl ether acetate, and 35% of cyclohexanone are mixed and the mixture is agitated for 8 h at room temperature. After the resin is dissolved completely, zirconium balls are added to carry out ball milling for 20 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, so as to obtain a filtrate, which is the ink that is used for inkjet computer-to-printing process and is helpful for improving image resolution.

When the above ink is used in an inkjet CTP7600 system, the produced plate can achieve a screen dot reproducibility of 98% or higher, a resolution up to 175 LPI, and a durability up to 50,000 or more copies.

EXAMPLE 8

Measured in mass percentage on the basis of the total mass of ink, 10% of a mixture of phenolic resin and epoxy resin (phenolic resin and epoxy resin are mixed at a mass ratio of 2:3), 10% of ethyl acetate, 10% of a mixture of ethylene glycol and propylene glycol (ethylene glycol and propylene glycol are mixed at a mass ratio of 2:3), and 70% of ethylene glycol monomethyl ether are mixed and the mixture is agitated for 12 h at room temperature. After the resins are dissolved completely, zirconium balls are added to carry out ball milling for 24 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, so as to obtain a filtrate, which is the ink that is used for inkjet computer-to-printing process and is helpful for improving image resolution.

When the above ink is used in an inkjet CTP7600 system, the produced plate can achieve a screen dot reproducibility of 98% or higher, a resolution up to 175 LPI, and a durability up to 50,000 or more copies.

EXAMPLE 9

Measured in mass percentage on the basis of the total mass of ink, 15% of a mixture of phenolic resin and epoxy resin (phenolic resin and epoxy resin are mixed at a mass ratio of 5:5), 10% of ethyl acetate, 10% of a mixture of propylene glycol and dipropylene glycol monomethyl ether acetate (propylene glycol and dipropylene glycol monomethyl ether acetate are mixed at a mass ratio of 1:4), and 65% of propylene glycol monomethyl propionate are mixed and the mixture is agitated for 12 h at room temperature. After the resins are dissolved completely, zirconium balls are added to carry out ball milling for 24 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, so as to obtain a filtrate, which is the ink that is used for inkjet computer-to-printing process and is helpful for improving image resolution.

When the above ink is used in an inkjet CTP7600 system, the produced plate can achieve a screen dot reproducibility of 98% or higher, a resolution up to 175 LPI, and a durability up to 50,000 or more copies.

EXAMPLE 10

Measured in mass percentage on the basis of the total mass of ink, 30% of phenolic resin, 20% of ethyl acetate, 20% of dipropylene glycol monomethyl ether acetate, and 30% of a mixture of ethylene glycol monoethyl ether and cyclohexanone (ethylene glycol monoethyl ether and cyclohexanone are mixed at a mass ratio of 9:1) are mixed and the mixture is agitated for 12 h at room temperature. After the resin is dissolved completely, zirconium balls are added to carry out ball milling for 24 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, so as to obtain a filtrate, which is the ink that is used for inkjet computer-to-printing process and is helpful for improving image resolution.

When the above ink is used in an inkjet CTP7600 system, the produced plate can achieve a screen dot reproducibility of 98% or higher, a resolution up to 175 LPI, and a durability up to 50,000 or more copies.

EXAMPLE 11

Measured in mass percentage on the basis of the total mass of ink, 30% of phenolic resin, 20% of ethyl acetate, 20% of dipropylene glycol monomethyl ether acetate, and 30% of a mixture of diethylene glycol monoethylether and propylene glycol monomethyl ether propionate (diethylene glycol monoethylether and propylene glycol monomethyl ether propionate are mixed at a mass ratio of 5:5) are mixed and the mixture is agitated for 12 h at room temperature. After the resin is dissolved completely, zirconium balls are added to carry out ball milling for 24 h. The liquid obtained by the ball milling is filtered by multistage filtration with sand core funnels to remove insoluble substances and/or impurities, and then filtered further through a filter membrane with a pore size of 0.22 μm to remove tiny insoluble substances and/or impurities, so as to obtain a filtrate, which is the ink that is used for inkjet computer-to-printing process and is helpful for improving image resolution.

When the above ink is used in an inkjet CTP7600 system, the produced plate can achieve a screen dot reproducibility of 98% or higher, a resolution up to 175 LPI, and a durability up to 50,000 or more copies.

EXAMPLE 12

Measured in mass percentage on the basis of the total mass of ink, 30% of phenolic resin, 20% of ethyl acetate, 20% of dipropylene glycol monomethyl ether acetate, and 30% of a mixture of ethylene glycol monoethyl ether, cyclohexanone, diethylene glycol monoethylether, and propylene glycol monomethyl ether propionate (ethylene glycol monoethyl ether, cyclohexanone, diethylene glycol monoethylether, and propylene glycol monomethyl ether propionate are mixed at a mass ratio of 2:1:2:5) are mixed and the mixture is agitated for 12 h at room temperature. After the resin is dissolved completely, zirconium balls are added to carry out ball milling for 28 h. The liquid obtained by the ball milling is filtered by multistage filtration with sand core funnels to remove insoluble substances and/or impurities, and then filtered further through a filter membrane with a pore size of 0.22 m to remove tiny insoluble substances and/or impurities, so as to obtain a filtrate, which is the ink that is used for inkjet computer-to-printing process and is helpful for improving image resolution.

When the above ink is used in an inkjet CTP7600 system, the produced plate can achieve a screen dot reproducibility of 98% or higher, a resolution up to 175 LPI, and a durability up to 50,000 or more copies.

The invention claimed is:

1. An ink for inkjet computer-to-plate, calculated in mass percentage and based on the total mass of the ink, the ink consists of:
   a cross-linkable resin: 10%~30%;
   a solvent with a low boiling point: 10%~35%;
   a poor solvent with a high boiling point: 5%~30%; and
   a bulk solvent: 5%~75%; wherein
   the cross-linkable resin is at least one selected from the group consisting of epoxy resin, phenolic resin, and silicone resin;
   the solvent with a low boiling point is a solvent with a boiling point less than 100° C.;
   the poor solvent with a high boiling point is at least one selected from the group consisting of ethylene glycol and dipropylene glycol monomethyl ether acetate;
   the bulk solvent is at least one selected from the group consisting of ethylene glycol monomethyl ether, ethylene glycol monoethyl ether, cyclohexanone, diethylene glycol monoethyl ether, and propylene glycol monomethyl ether propionate.

2. The ink for inkjet computer-to-plate according to claim 1, wherein the solvent with a low boiling point is at least one selected from the group consisting of ethanol, diethyl ether, and ethyl acetate.

3. A preparation method of the ink for inkjet computer-to-plate according to claim 1, the preparation method comprises the following steps: calculated in mass percentage and based on the total mass of the ink with a mixing a cross-linkable resin in an amount of 10%~30%, solvent with a low boiling point in an amount of 10%~35%, a poor solvent with a high boiling point in an amount of 5%~30%, and a bulk solvent in an amount of 5%~75%; and agitating at room temperature to form a mixture; after the cross-linkable resin is dissolved completely, adding zirconium balls into the mixture to carry out ball milling; carrying out multistage filtration with sand core funnels to remove one or more of insoluble substances or impurities in a liquid obtained by the ball milling to obtain a first filtrate; and filtering the first filtrate with a filter membrane having a pore size of 0.22 μm to further remove one or more of insoluble substances or impurities in the first filtrate, so as to obtain a second filtrate, which is the ink; wherein
   the cross-linkable resin is at least one selected from the group consisting of epoxy resin, phenolic resin, and silicone resin;
   the solvent with a low boiling point is a solvent with a boiling point less than 100° C.;
   the poor solvent with a high boiling point is at least one selected from the group consisting of ethylene glycol and dipropylene glycol monomethyl ether acetate; and
   the bulk solvent is at least one selected from the group consisting of ethylene glycol monomethyl ether, ethylene glycol monoethyl ether, cyclohexanone, diethylene glycol monoethyl ether, and propylene glycol monomethyl ether propionate.

4. The method according to claim 3, wherein the solvent with a low boiling point is at least one selected from the group consisting of ethanol, diethyl ether, and ethyl acetate.

5. The method according to claim 3, wherein the period duration of the agitation at room temperature is in a range of 8~12 h.

6. A preparation method of the ink for inkjet computer-to-plate according to claim 2, the preparation method comprises the following steps: calculated in mass percentage and based on the total mass of the ink, with a mixing cross-linkable resin in an amount of 10%~30%; solvent with a low boiling point in an amount of 10%~35%, a poor solvent with a high boiling point in an amount of 5%~30%, and a bulk solvent in an amount of 5%~75%, and agitating at room temperature to form a mixture; after the cross-linkable resin is dissolved completely, adding zirconium balls into the mixture to carry out ball milling; carrying out multistage filtration with sand core funnels to remove one or more of insoluble substances or impurities in a liquid obtained by the ball milling to obtain a first filtrate; and filtering the first filtrate with a filter membrane having a pore size of 0.22 μm to further remove one or more of insoluble substances or impurities in the first filtrate, so as to obtain a second filtrate, which is the ink; wherein
   the cross-linkable resin is at least one selected from the group consisting of epoxy resin, phenolic resin, and silicone resin;
   the solvent with a low boiling point is at least one selected from the group consisting of ethanol, diethyl ether, and ethyl acetate;
   the poor solvent with a high boiling point is at least one selected from the group consisting of ethylene glycol and dipropylene glycol monomethyl ether acetate;
   the bulk solvent is at least one selected from the group consisting of ethylene glycol monomethyl ether, ethylene glycol monoethyl ether, cyclohexanone, diethylene glycol monoethyl ether, and propylene glycol monomethyl ether propionate.

7. The method according to claim 6, wherein the period duration of the agitation at room temperature is in a range of 8~12 h.

* * * * *